United States Patent [19]

Bruschke et al.

[11] 3,776,671

[45] Dec. 4, 1973

[54] APPARATUS FOR PRODUCING CONFECTION BARS

[75] Inventors: Joost M. M. Bruschke; Ronald E. Minor, both of Richmond, Va.

[73] Assignee: Eskimo Pie Corporation, Richmond, Va.

[22] Filed: Nov. 13, 1970

[21] Appl. No.: 89,402

[52] U.S. Cl.............. 425/164, 425/311, 425/313, 425/377, 62/320
[51] Int. Cl............................................. A23g 5/02
[58] Field of Search ............... 107/4, 54; 425/164, 425/308, 310, 311, 313, 377, 376; 62/320

[56] References Cited
UNITED STATES PATENTS

| | | | |
|---|---|---|---|
| 3,280,763 | 10/1966 | Komberec | 425/308 |
| 3,196,809 | 7/1965 | Nelson et al. | 425/311 |
| 3,621,517 | 11/1971 | Nishikawa et al. | 425/161 |
| 3,344,752 | 10/1967 | Ilnes | 425/308 |
| 2,969,026 | 7/1958 | Genich | 425/311 |
| R9,377 | 9/1880 | Smith | 425/311 |
| 2,838,012 | 6/1958 | Weidenmiller et al. | 425/311 |

FOREIGN PATENTS OR APPLICATIONS

| | | | |
|---|---|---|---|
| 1,203,270 | 1/1960 | France | 425/377 |

*Primary Examiner*—J. Spencer Overholser
*Assistant Examiner*—David S. Safran
*Attorney*—Beveridge & De Grandi

[57] ABSTRACT

A method and apparatus for producing confection bars in which a unitary cutting element is periodically passed transversely across a length of confection mix being extruded from a downwardly facing extruder nozzle positioned over a conveyer with the cutting element being supported and caused to move through the extruded length from one side to the other in a plane intersecting the plane of the conveyer immediately below the nozzle at an acute angle, the reciprocating single cutter element and the extruder nozzle assembly being mounted on a support frame that is rotatable to selected angular positions relative to the conveyer in a plane parallel to the line of conveyer movement.

2 Claims, 8 Drawing Figures

PATENTED DEC 4 1973 3,776,671
SHEET 1 OF 3
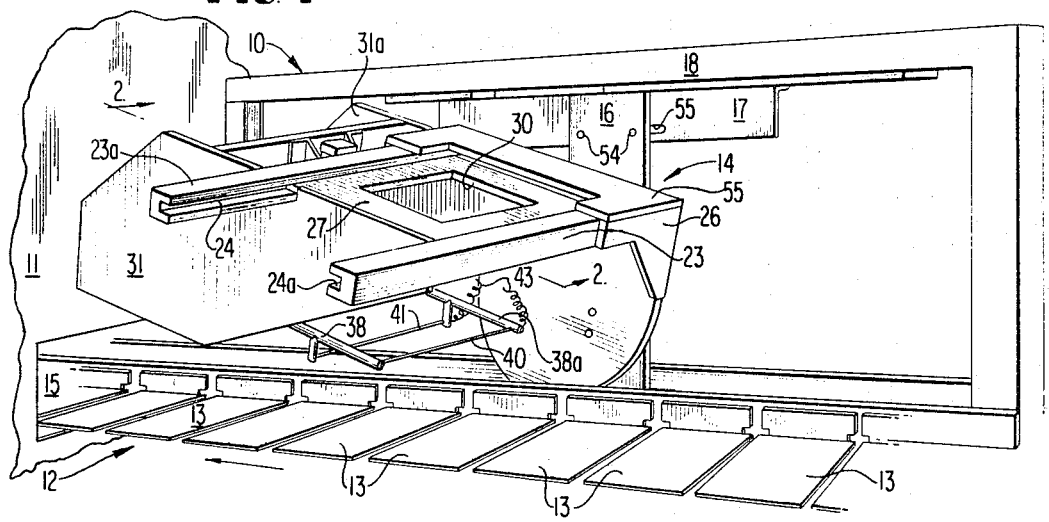
FIG. 1
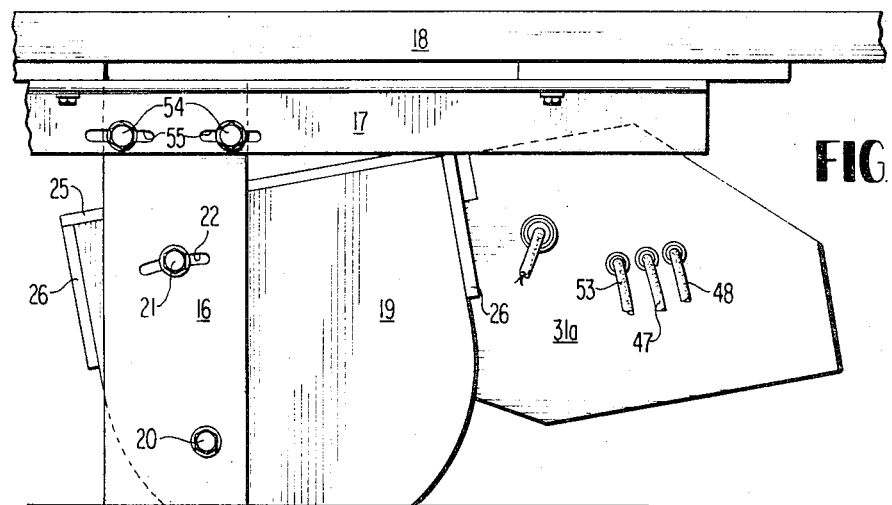
FIG. 5
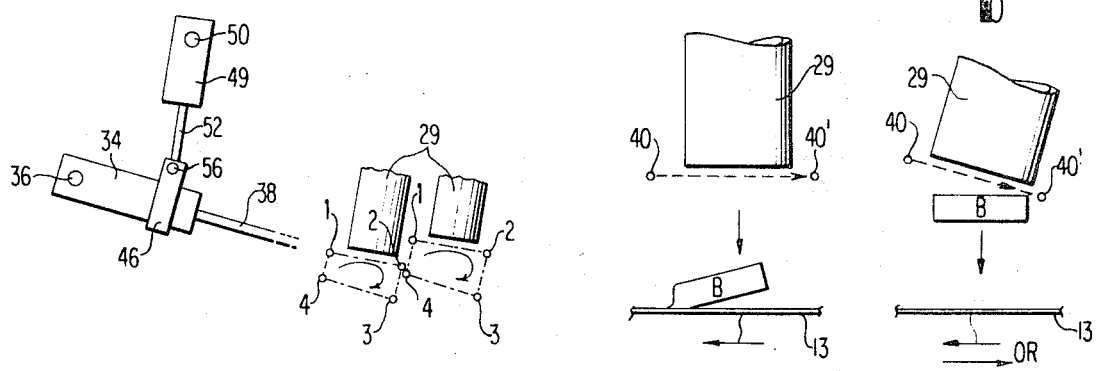
FIG. 6
FIG. 7
INVENTORS
JOOST M.M. BRUSCHKE, RONALD E. MINOR
BY Beveridge & De Grandi
ATTORNEYS

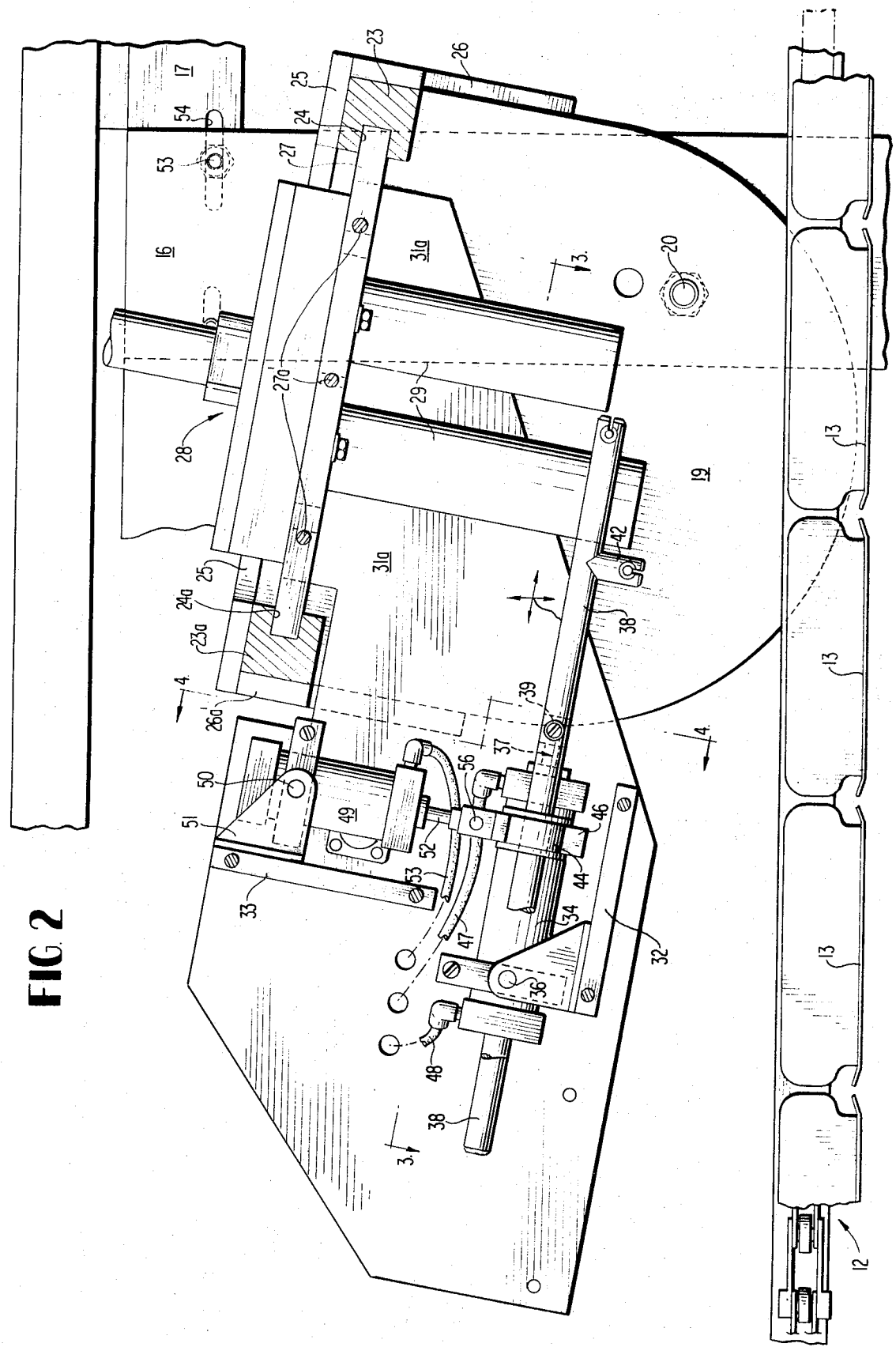

APPARATUS FOR PRODUCING CONFECTION BARS

This invention relates to the well-known extrusion process for producing bars of confection by continuously extruding the confection mix from a downwardly facing extruder nozzle positioned over a conveyor and periodically slicing the end portion from the extruded length which falls by gravity onto the conveyor for further processing of the individual bars that have the outline form of the extruder nozzle mouth. Examples of the extrusion process of producing bars of a frozen confection are illustrated in the applicant's U. S. Pat. Nos. 2,739,545 and 3,257,051.

In severing the bar from the lower end of the extruded length in the prior art, it has previously been found necessary to perform the severing action by simultaneously moving two cutting elements together from opposite sides of the extruded length if the severed bar is to fall in a manner to land flatly on its lower face. As will be subsequently discussed in connection with FIG. 7, previous attempts have been made to sever bars, or slices, by passing a unitary severing element, such as a heated wire, in a single motion transversely across the extruded length from one side of the bar to the other, but these attempts to utilize a single or unitary severing element were not successful as the bar severed by the single severing element would always fall away from the extruder in a tilted position to land on the conveyor surface along one edge, which would deform the shape of the bar. The dual head cutter arrangement, illustrated in the two aforesaid patents, avoids this disadvantage but has the further disadvantage that it produces a small ridge across the central face of the bar where the two cutting edges meet.

An object of this invention is to provide a method and apparatus for severing bars from an extruded length of confection in which the face of the bar is smooth and unmarred.

A further object of the invention is to provide a method and apparatus for severing bars from an extruded length of confection in a single motion severing stroke.

Another object of the invention is to produce a simple and efficient cutter for severing confections from an extruded length by a unitary cutting element.

Yet still another object of the invention is to provide a supporting structure for a unitary severing element cutter of a confection extruding machine that can be utilized for different extruder heads and equipment operating speeds.

These objects and deficiencies of the prior art have been solved by utilizing a unitary cutting head movable by means of two pneumatic cylinders in a generally rectangular motion that severs bars from an extruded length of confection in a single stroke passing transversely across the entire cross section of the extruded length but in which the cutter and extruder nozzle or nozzles are mounted such that the slice is severed in a direction that defines an acute angle with the plane of the conveyor surface. As can be seen in the subsequent description, the extruder nozzle or nozzles and the cutter with a unitary, single cutting head that passes transversely across the downwardly facing mouth of the extruder nozzle are supported by a structure that is tiltable in the vertical plane parallel to the direction of conveyor motion so that the longitudinal axis of the extruder nozzle is tilted at an acute angle to a vertical line that is normal to the conveyor surface and the unitary cutting element moves in a plane that defines an acute angle with the conveying surface.

The exact nature of this invention as well as other objects and advantages thereof become readily apparent when considering the following descriptive matter illustrated in the accompanying drawings in which:

FIG. 1 is a perspective view of a portion of the exterior of an extruder type frozen confection producing machine showing the cutter and extruder nozzle support sturcture with the cutter affixed but the extruder nozzle assembly omitted for purposes of clarity.

FIG. 2 is a section taken along section line 2—2 of FIG. 1 but with the extruder nozzle assembly installed.

FIG. 5 is an end view of the support structure for the extruder nozzle assembly and cutter as seen from the opposite direction of FIG. 1.

FIG. 6 is a schematic drawing illustrating the major components and mode of operation of the cutter.

FIG. 7a and 7b is a schematic drawing illustrating the mode of operation of a cutter having a unitary cutting element as practiced by this invention and as previously unsuccessfully practiced.

Figure 3:
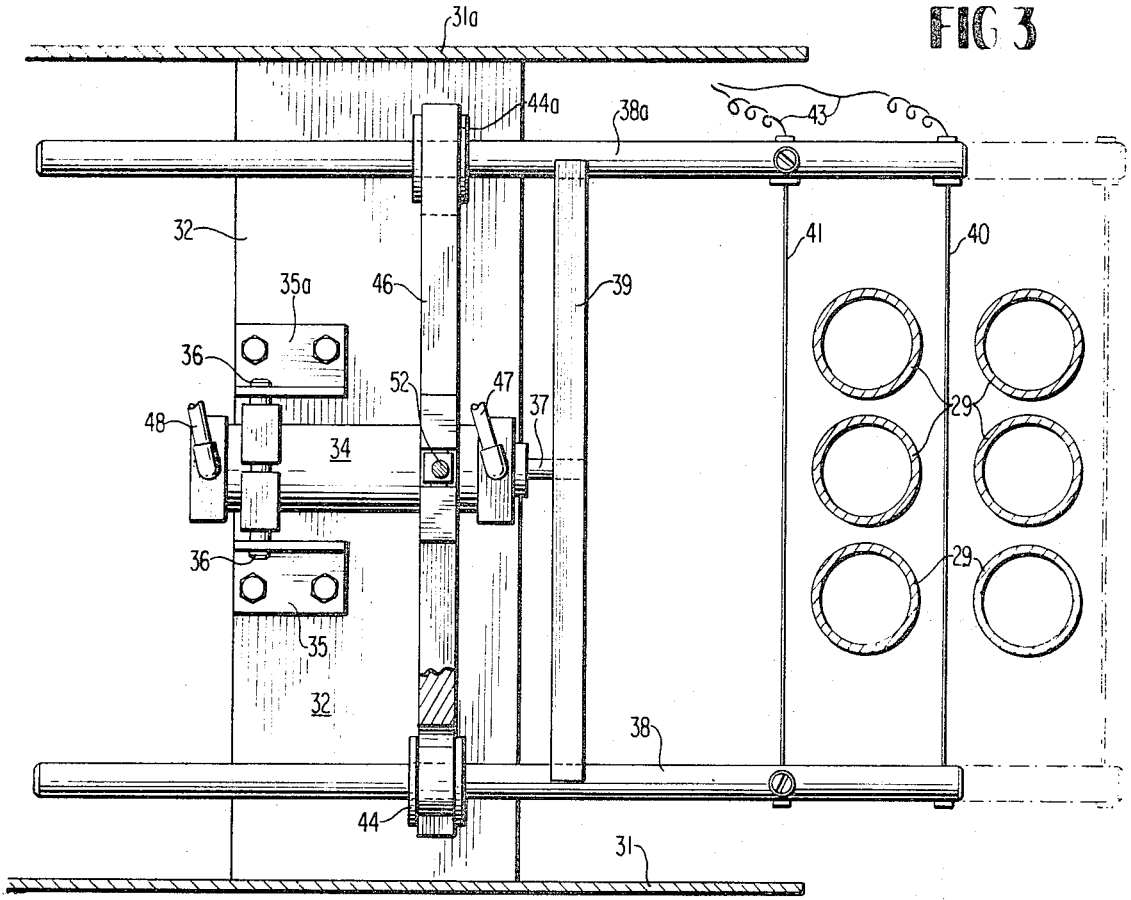
FIG. 3 is a cross section taken along section line 3—3 of FIG. 2.

FIG. 1 shows a portion of the commercial version of the machine for producing frozen confections by the extrusion process that is described in U. S. Pat. No. 2,739,545. A supporting frame 10 of beams extending outwardly from one end of the freezing chamber 11 of the machine with the conveyor 12 and its moving line of pallet plates 13, on whicn the bars sliced from the end of the mix being extruded from the extruder nozzle are supported while being transported through the freezing chamber, being supported from this frame 10. The pallet plates 13, after passing beneath the extruder nozzle assembly and cutter that are supported by the mounting frame 14 (to be described in more detail subsequently), enter the freezing chamber 11 through the cut-out 15 in the wall of the freezing chamber and transport the bars, that have dropped onto the pallets 13 after being severed from the extruder nozzle, through the freezing chamber for hardening, as discussed in U. S. Pat. No. 2,739,545.

The extruder-cutter mounting frame 14 is supported by the main support frame 10 and includes a vertically extending support plate 16 that is bolted at the top to a flange 17 extending below the upper beam 18 of the main support frame 10 and is similarly secured or bolted to a lower horizontally extending beam of the main frame 10. The upper bolted connections for the support plate 16 are most conveniently made by means of bolts 54 extending through the support plates 16 and horizontal slots 55 in the flange 17 to provide adjustability of the vertical support plate in a direction parallel to the conveyor, a similar arrangement being utilized for the lower bolted connections. A flat pivot plate 19 is connected to the vertical support plate 16 by bolts at two points, a bolted connection 20 in the lower portion of the plates and an upper bolted connection 21 that extends through an arcuate slot 22 in the vertical support plate 16 so that the pivot plate 19 has a limited degree of rotational freedom substantially parallel to the line of motion of the pallet plates 13. A pair of parallel U-shaped support arms 23 and 23a with longitudinally extending slots 24 and 24a are bolted at one end to an arm support plate 25 and gussets 26 and 26a that are in turn bolted to the top and side edges of the pivot plate 19 so that the support arms 23 and 23a extend perpendicularly outwardly from the two upper corners of the pivot plate 19 with the slots 24 and 24a facing each other in a parallel array. Opposite edges of a mounting plate 27, from which the extruder assembly and cutter are supported, fit in the grooves 24 of the support arms. The extruder assembly 28, having a feed tube 28a connected to a pressurized source of ice cream mix in a plastic condition, is bolted to the mounting plate 27 with the extruder tubes 29 extending downwardly through the central cut-out 30 in the mounting plate 27. Details of the extruder assembly and the bolted attachment to the mounting plate are not illustrated but the extruder assembly illustrated is intended to be the type of six tube assembly that is described in the applicant's co-pending application entitled Method and Apparatus for Producing Confection Bars, Ser. No. 74,229, filed Sept. 22, 1970, for producing simultaneously six small, miniature confection bars. However, any other type of extruder assembly could be utilized which extrudes ice cream or any flowable confection as a downwardly issuing length from the downwardly facing mouth of an extruder nozzle or nozzles.

The cutter assembly is supported between two parallel side plates 31 and 31a having their upper edges affixed by means of bolts 27a to the opposite edges of the mounting plate 27 in a manner to extend downwardly from the mounting plate 27, spaced from and parallel to the pivot plate 19. Opposite outer edges of each of a pair of cutter actuating cylinder support plates 32 and 33 are bolted to the side plates 31 and 31a to extend between the two side plates 31 and 31a with the actuating cylinder support plates being perpendicular to each other. The casing of the primary, dual acting, reciprocating, actuating cylinder or motor 34 is pivotally supported by the pivot pins 36 between support gussets 35 and 35a that are bolted to the lower actuating cylinder support plate 32 such that the piston rod 37 of the primary actuating cylinder 34 extends in a direction that is generally perpendicular to the longitudinal axes of the extruder tubes 29, the primary cutter actuator 34 having a limited degree of pivotal motion about the axis of the pins 36 which is perpendicular to the side plates 31 and 31a. Pneumatic lines 47 and 48 connect a source of air through suitable control valves to each of the two interior ends of the primary actuating cylinder 34 such that the piston and rod 37 are positively driven in both directions.

A pair of cutter arms 38 and 38a connected by the spacing bar 39 extend in a parallel array on either side of the primary cutter actuating cylinder 34 parallel to its piston rod 37, the front end of which is affixed to the center of the spacer bar 39. A forward cutting wire 40 is affixed at either end and tightly stretched between the forward ends of the cutter arms 38 and 38a and a rear cutting wire 41 is affixed to and stretched between two short, downwardly extending cutter arm stubs 42 and 42a so that each cutting wire is located a short distance below the ends of the vertically staggered two rows of extruder tubes 29, wires 43 electrically connecting to each of the cutting wires 40 and 41 to provide electric current that heats the wires. Each of the cutter arms 38 and 38a, rearwardly of the spacing bar 39, is slidably in a bushing 44 and 44a that are supported in slots 45 and 45a at opposite ends of a yoke 46 that extends transversely between the respective cutter arms 38 and 38a, the primary actuating cylinder 34 extending through a cut-out in the center of the yoke.

A secondary, single acting, actuating cylinder or motor 49 is pivotally mounted by means of pivot pins 50 between gusset plates 51 and 51a that are bolted to the upper actuating cylinder support plate 33 with the piston rod 52 of the secondary cutter actuating cylinder 49 extending downwardly generally parallel to the extruder tubes 29. An air line 53 connects between a source of pressurized air and the lower end of the secondary actuating cylinder 49 through suitable control valves such that the piston and piston rod 52 of the secondary cutter actuating cylinder 49 are positively lifted to the upper position and drop to the lower position through the weight of the yoke 46 and attached parts. The outer end of the secondary actuating cylinder piston rod 52 is pivotally connected to the upper, central portion of the yoke 46 by the pivot pins 56.

The operation of the cutter is illustrated in the schematic diagram of FIG. 6. The position of each of the cutting wires 40 and 41 before commencing the severing stroke is indicated by the numeral 1 in FIG. 6. Upon actuating the valve in air line 48 to admit high pressure air to the rear of the primary actuating cylinder 34 and the valve in air line 47 to connect it to atmosphere, the piston and piston rod 37 of the primary cutter actuator is moved from a retracted position with the cutting wires positioned at position 1 to the extended position designated as 2 while air line 53 of the secondary actuating cylinder 49 is connected through its valving arrangement to the high pressure air source to maintain the piston and piston rod 52 of the secondary cutter actuating cylinder 49 in the retracted position so that the cutter wires 40 and 41 pass transversely across and immediately below the downwardly facing mouths of the extruder tubes 29 so as to sever an end portion of the length of confection mix that is extruded from the extruder tubes. Upon the cutting wires 40 and 41 reaching position 2 on the opposite side of the extruder tubes from the original position 1, the air line 53 of the secondary cutter actuating cylinder is connected through its valving arrangement to the atmosphere which causes the piston and piston rod 52 of the secondary motor to fall to the lowered position by the weight of the cutter assembly connected to the yoke 46, the primary cutter actuating cylinder 34 pivoting about the pivot pins 36 causing the cutter wires 40 and 41 to be lowered a substantial distance below the mouth of the extruder tubes 29 to position 3 shown in FIG. 6. When the piston rod 52 of secondary cutter actuating cylinder and the attached yoke 46 reach the lower position, valves are actuated by the control mechanism to admit high pressure air through the air line 47 to the front end of the primary cutter actuating cylinder 34 and the rear air line 48 is connected to atmosphere so that the piston and piston rod 37 of the primary actuator are retracted to return the cutter wires 40 and 41 across the face of the extruder tubes 29 to the position indicated as position 4 of FIG. 6. The control valving arrangement then connects air line 53 of the secondary cutter actuating cylinder to a source of air pressure that causes the piston and piston rod 52 of the secondary actuator to be lifted to the upper position, bringing the cutter wires 40 and 41 back to the original position 1. Pivots 50 and 56 of the secondary cutter actuator and the yoke prevent any binding as the cutter arms 38 are moved in the generally rectangular pattern of motion illustrated in FIG. 6. The details of the valving arrangement and controls that control the air supply to the primary and secondary cutter actuating cylinders 34 and 49 are not illustrated as such controls are known to those skilled in the art and could take the form of the control for the pneumatic cutter described in application Ser. No. 880,339 filed Nov. 26, 1960, now abandoned and assigned to the assignee of this application. Conventionally such controls and the control for the cutter described in this application would be actuated from a shaft of the conveyor so that movement of the cutter wire or wires is synchronized with that of the conveyor.

Referring now to FIG. 7, it should be noted that previously attempts have been made to utilize a single cutting element that passes transversely across the entire lower face of an extruder nozzle to sever a slice from the mass being extruded from the extruder nozzle with the results illustrated in FIG. 7a. As shown in this figure, and as is apparent from the two previously noted U. S. Pat. Nos. 2,739,545 and 3,257,051, the extruder tube 29 or housing has conventionally been mounted so as to be perpendicular to the conveying surfaces located immediately below with the confection being extruded in a direction that is normal to the conveyor. However, when the cutting wire 40 of this arrangement is moved across the lower face of the extruder nozzle 29 to the position 40', the leading edge of the mass being severed apparently drops below the level of the trailing edge of the severed mass so that the severed bar falls in a tilted position causing the leading edge of the bar to strike the pallet 13 first and deform the bar.

In the applicant's arrangement the extruder nozzles 29 and the cutter assembly are supported from the pivot plate 19, in the manner previously described, so that the cutter and extruder assembly that are supported by the moveble mounting plate 27 can be pivoted about the fixed pivot 20 of the pivot plate 19 to various angular positions, as dictated by the length of the slots 22, relative to the upper surface of the pallets 13 in a plane that is parallel to the line of motion of the conveyor pallets. This the axis of the extruder tube 29 of FIG. 7b and the line of motion of the cutter wire 40 can be adjusted to establish an acute angle with a perpendicular to the surface of the pallet 13. In the arrangement described in this application and schematically illustrated in FIG. 7b, when the cutting wire 40 passes across the lower face of the extruder tube 29 to position 40', the severed bar B falls away in a plane that establishes an acute angle with the plane of the cutter wire 40 but, due to the tilted position of the extruder tubes 29 and the plane of cutting wire motion with respect to conveyor, the severed bar B is parallel to the pallet 13 and the entire face of the severed bar B simultaneously contacts the pallet 13. This achieves the same results as that accomplished by the double adged cutter that has previously been successfully utilized.

Figure 4:
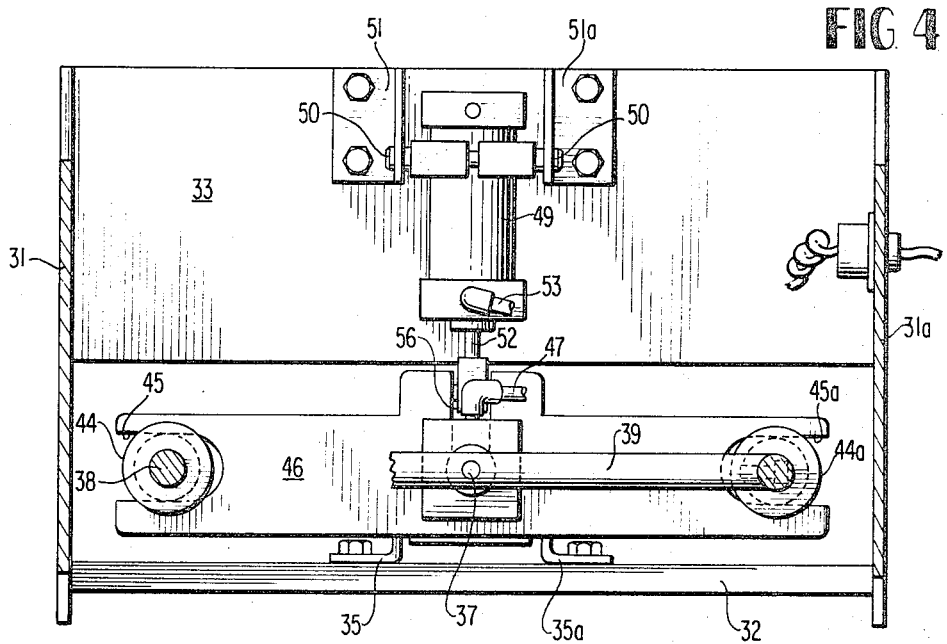
FIG. 4 is a cross section taken along section line 4—4 of FIG. 2.

Although the extruder assembly that is illustrated in FIGS. 1–6 shows a two-tier arrangement of six extruder tubes in two rows of three tubes each with the mouths of one row of tubes at a lower level that the other row, other extruder assemblies could obviously be substituted in which either single or multiple bars are sliced from one or more extruded lengths and fall onto the pallet plates for conveyance through the freezing chamber. The angle at which the pivot plate 19 is tilted with respect to the vertical support plate 16 attached to the support frame of the extrusion machine varies as dictated by a number of variables, that include such things as the size of the bars being extruded, the viscosity of the mix, the rate of extrusion, the speed of the conveyor, etc. However, by pivoting the pivot plate 19 about the lower pivoting support point 20, the mounting plate 27 and the supported extruder assembly and cutter can be adjusted to that angle which will result in the lower faces of the severed bars B landing squarely on the surface of the support pallets 13, which can be moving in either direction with respect to the line of motion of the cutting wires as indicated by the arrows in FIG. 7b. The arrangement of the bolted connection 53 passing through the vertical support plate and riding in the slots 54 of the flange 17 affixed to the upper beam 18 and a similar arrangement affixing the lower portion of the vertical support plate 16 to the lower beam of the support frame permits adjustment of the extruder assembly and the cutter parallel to the direction of motion of the conveyor 12 so that the bar or bars severed from the extruder assembly will fall onto the desired area of each pallet 13 passing below the extruder. As with all extrusion type machines, a severing stroke of the cutting wires 40 and 41 is made in a timed relation such that a set of severed bars is deposited on each pallet 13 in turn.

It should be understood that the foregoing disclosure relates to only a single embodiment of the invention and that numerous modifications or alterations may be made therein by one normally skilled in the art without departing from the spirit and scope of the invention as set forth in the appended claims.

We claim:

1. An improved extruder-cutter apparatus for depositing slices of a frozen confection mix in a plastic condition onto plates of a conveyor for movement through a freezing unit to produce hard frozen confection slices comprising a fixed, support frame adjacent the freezing unit, a conveyor having horizontally extending plates arranged for movement sequentially along a line passing adjacent said support frame to the freezer unit, a vertically oriented pivot plate supported on said support frame for angular motion about a pivot point on said frame in a vertical plane parallel to the line of movement of the conveyor plates, a source of frozen confection mix under pressure in a plastic condition, an extruder nozzle having an open mouth at one end and connected to said source of mix continuously discharged from the open mouth of the nozzle as an extruded segment of mix, means affixing said extruder nozzle to said pivot plate, a single cutting element supported by support arm means, means supporting said support arm means on said pivot plate for movement of said cutting element transversely of said nozzle mouth in a plane spaced closely adjacent and below the mouth from a retracted position on one side of the mouth to an extended position on the other side and returning said element to the retracted position via a path having a greater clearance between the cutting element and the nozzle mouth, means retaining said pivot plate in a position on said frame that said plane of movement of said cutting element and the nozzle mouth are inclined to the plane of said conveyor plates at that small acute angle as will establish the extruded length of mix as a vertically depending segment with the component of the cross sectional area of said nozzle mouth parallel to said conveyor plates being substantially greater than the component of said cross sectional area perpendicular to said conveyor plates and means for periodically moving said arms and cutting element between said retracted and extended positions in that timed relation to the conveyor movement as will sever from the end of the continuously extruded, depending segment slices of confection mix falling by gravity onto successive conveyor plates spaced below the extruded segment.

2. The apparatus of claim 1 wherein said cutting element is a wire stretched between a pair of interconnected, spaced-apart elongated arms, a yoke extends transversely of said arms with bushing means at opposite ends of said yoke slidably supporting said arms for lengthwise movement, a first reciprocating actuator is supported by said pivot plate for limited pivotal motion about an axis perpendicular to said arms and includes a piston connected to said arms movable parallel therewith between a forward and a rearward position, a second reciprocating actuator is supported by said pivot plate for limited pivotal motion about an axis perpendicular to said arms and includes a piston connected to said yoke movable between an extended and a retracted position in a direction substantially perpendicular to said yoke, and control means are connected to said actuators for (1) causing said first actuator piston to move from its rearward position to its forward position with said second actuator piston in its retracted position, (2) causing said second actuator piston to move from its retracted position to its extended position upon completion of (1) preceding, (3) causing said first actuator piston to move from its forward position to its rearward position upon completion of (2) preceding, and (4) causing said second actuator piston to move from its extended position to its retracted position upon completion of (3) preceding.

* * * * *